Patented May 28, 1946

2,401,234

UNITED STATES PATENT OFFICE 2,401,234

PREPARATION OF ALKYLAMINO-ALKANETHIOLS

Mark Wendell Farlow, Wilmington, Del., assignor to E. I. du Pont de Nemours & Company, Wilmington, Del., a corporation of Delaware No Drawing. Application November 11, 1943, Serial No. 509,898

3 Claims. (Cl. 260—583)

This invention relates to alkylaminoalkanethiols. More particularly, it relates to a process for preparing alkylaminoalkanethiols.

Alkylaminoalkanethiols, either as such or in the form of derivatives such as salts, thioethers, etc., are of importance in the pharmaceutical industry because of their physiological activity. They have heretofore been but little investigated, chiefly because the processes proposed for their preparation have not been entirely satisfactory.

An object of this invention is to provide a general process for the preparation of alkylaminoalkanethiols. Another object is to provide a process giving alkylaminoalkanethiols of good purity. A more specific object is the preparation of gamma-dialkylaminopropane thiols. Other objects will appear hereinafter.

These objects are accomplished by the present invention, which comprises reacting preferably at least three moles of an alkylamine, preferably a lower alkylamine, having hydrogen on the amino nitrogen with one mole of an acylthioalkyl halide, preferably an acylthio lower alkyl halide, in which the halogen is separated from the acylthio group by at least two carbon atoms.

The process is illustrated by the equation:

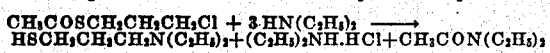

Preferably, the reaction is continued until there is no further separation of amine hydrochloride. The latter is removed from the reaction mixture and the alkaminoalkanethiol is separated from the amide by-product by appropriate procedures.

The more detailed practice of the invention is illustrated by the following examples, wherein parts given are by weight. There are, of course, many forms of the invention other than these specific embodiments.

Example I

A solution of 90 parts of diethylamine and 52 parts of beta-chloroethanethiol acetate (prepared by reacting thiolacetic acid with vinyl chloride according to the process described in Ellingboe application Serial No. 476,625, filed February 20, 1943, in 150 parts of anhydrous ether is sealed in a pressure vessel and heated for eighteen hours at 100° C. The vessel is cooled, the diethylamine hydrochloride filtered off and the filtrate separated into its components by fractional distillation. There is obtained 32 parts of beta-diethylaminoethanethiol (yield: 64% of theory) boiling at 64-65° C. at 20 mm. and 29 parts of N, N-diethylacetamide boiling at 80° C. at 20 mm. The thiol has a neutral equivalent of 126, as determined by titration with standard acid in the presence of Methyl Red, and it contains 23.5% of thiol sulfur as determined by titration with standard iodine solution. The calculated values are 133 and 24.1, respectively.

Example II

One hundred parts of gamma-chloropropanethiol acetate (prepared by reacting thiolacetic acid with allyl chloride according to Sjöberg, Ber. 74B, 64, (1941)) and 300 parts of diethylamine are mixed and heated in a pressure vessel at 100° C. for 18 hours. The product, after removal of the diethylamine hydrochoride, gives on distillation diethylamine and a mixture (103 parts) of N,N-diethylacetamide and gamma-diethylaminopropanethiol. Since this mixture cannot be separated by distillation, it is dissolved in 200 parts of 50% aqueous potassium hydroxide, and the diethylacetamide is removed by repeated extraction with ether. The aqueous layer is then neutralized with carbon dioxide, the oil which separates is extracted with ether, dried and distilled. There is obtained 20 parts (yield: 23% of theory) of gamma-diethylaminopropanethiol, boiling at 75-76° C. at 20 mm. The thiol has a neutral equivalent of 148 and contains 21.8% of thiol sulfur. The calculated values are 147 and 21.4, respectively.

The process is applicable to any alkaylamine having hydrogen on amino nitrogen, such as methylamine, ethylamine, butylamine, isobutylamine, octylamine, dodecylamine, hexadecylamine, octadecylamine, diisopropylamine, dicyclohexylamine, dihexylamine, dimethylamine, dibutylamine, etc. Lower alkylamines are preferred. Mixtures of amines can be used, in which case two or more alkylaminoalkanethiols are obtained. The secondary alkylamines react more cleanly and give better yields than the primary ones and they are therefore preferred. The other reactant may be any aliphatic acylthioalkyl halide in which the halogen is removed from the acylthio group by at least two carbons, such as beta-bromopropanethiol acetate, beta-chlorobutanethiol acetate, gamma-bromopentanethiol acetate, omega-bromoundecanethiol propionate, chloro-1-octadecanethiol-10 acetate, etc. The acylthio group may be that of any aliphatic thiol carboxylic acid, but it is most economical to use an acetylthioalkyl halide since the acylthio group is consumed in the reaction and does not appear in the final product. Acylthio lower alkyl halides are preferred. Since the halogen of the acylthioalkyl halide is removed as a byproduct, it is preferred that acylthioalkyl halides wherein the halogen is of atomic weight between 30 and 80, and preferably chlorides, be used.

Preferably at least three moles of the amine are used per mole of the acylthioalkyl halide, in order to insure complete reaction of the latter which, in general, is the more expensive reactant. However, less than three moles of amine may be used, if desired. The reaction time and temperature may vary according to the reactants selected, but there is no difficulty in ascertaining the best reaction conditions. In general, elevated temperatures, e. g. 75-150° C., are used since at ordinary temperatures the reaction may be undesirably slow. It is preferable to continue the reaction until there is no further separation of amine hydrohalide. Although the reaction will proceed satisfactorily in the absence of a solvent, the use of a solvent facilitates the removal of the amine hydrohalide and is therefore preferable. Suitable solvents are water, methanol, ethanol, ether, benzene or an excess of the amine. Of this group the last three are preferred because they are essentially nonsolvents for amine salts.

In addition to their usefulness as therapeutic agents, the alkylaminoalkanethiols are valuable intermediates in organic syntheses, in view of the presence of two reactive groups, one acidic and one basic, in the same molecule.

The term "lower alkyl" is used to denote an alkyl group of one to seven carbon atoms. Thus a lower alkylamine is an amine wherein the alkyl group or groups have from one to seven carbons each. An acylthio lower alkyl halide is an alkyl halide of from one to seven carbon atoms having an acylthio substituent.

The above description and examples are intended to be illustrative only. Any modification of or variation therefrom which conforms to the spirit of the invention is intended to be included within the scope of the claims.

What is claimed is:

1. Process for the preparation of gamma-diethylaminopropanethiol which comprises reacting at 75-150° C. gamma-chloropropanethiol acetate with at least three moles, per mole of acylthioalkyl halide, of diethylamine and isolating the gamma-diethylaminopropanethiol.

2. Process for the preparation of an N,N-diethyl-aminoalkanethiol which comprises heating at least three mols of diethylamine at a temperature of 75 to 150° C., with one mol of a chloroalkyl thiolacetate having the chlorine from two to ten carbons removed from the acetylthio group until the diethylaminoalkanethiol is formed and isolating the diethylaminoalkanethiol formed.

3. Process for the preparation of N,N-diethyl-aminoethanethiol which comprises heating at least three mols of diethylamine at a temperature of 75 to 150° C. with one mol of beta-chloroethyl thiolacetate and isolating the diethylaminoethanethiol formed.

MARK WENDELL FARLOW.